United States Patent

[11] 3,625,996

[72] Inventor Donald M. Fenton
    Anaheim, Calif.
[21] Appl. No. 745,991
[22] Filed July 19, 1968
[45] Patented Dec. 7, 1971
[73] Assignee Union Oil Company of California
    Los Angeles, Calif.

[54] PREPARATION OF OLEFINIC ACIDS AND ESTERS
    13 Claims, No Drawings
[52] U.S. Cl.................................................. 260/486 R,
    260/410.5, 260/410.6, 260/410.9 R, 260/413,
    260/468 R, 260/469, 260/514 R, 260/515 R,
    260/526 N
[51] Int. Cl....................................................... C07c 69/54
[50] Field of Search............................................ 260/486,
    526 N, 410.9, 410.6

[56] References Cited
    UNITED STATES PATENTS
    3,238,239  3/1966  Schweckendiek et al. ...  260/486 X Primary Examiner—Lewis Gotts
Assistant Examiner—Paul J. Killos
Attorneys—Milton W. Lee, Richard C. Hartman, Lannas S. Henderson, Dean Sandford, Robert E. Strauss and William S. Brown ABSTRACT: A process for preparation of olefinic acids or esters from dicarboxylic acids or esters comprising contacting the dicarboxylic acid or ester with a complex catalyst comprising a Group VIII noble metal and a ligand from the group consisting of organic phosphines, arsines and stibines. The olefinic acids and esters are useful as monomers in preparation of a wide variety of polymeric or copolymeric resins.

PREPARATION OF OLEFINIC ACIDS AND ESTERS

This invention relates to a process for preparing olefinic acids or esters from dicarboxylic acids or esters by contacting these compounds with a complex catalyst comprising a Group VIII noble metal and a ligand from the group consisting of organic phosphines, arsines or stibines. The reaction involves decomposition of the dicarboxylic acid or ester to form the olefinic acid or ester, carbon monoxide and water or an alcohol according to the following equations:

$$HOOCCR_2CHRCOOH \longrightarrow CR_2{=}CRCOOH + H_2O + CO \quad (1)$$
$$ROOCCR_2CHRCOOR \longrightarrow CR_2{=}CRCOOR + ROH + CO \quad (2)$$

The process of the invention is applicable to any acid having the formula $$HOOCCR_2CHRCOOH,$$

where the R's are hydrogen or the same or different alkyl, alkaryl, aralkyl or cycloalkyl radicals having from about one to 20 carbons. The process is particularly applicable to succinic acid, i.e., the acid in which the R's in the above formula are hydrogen. However, the R's may also be any of the radicals falling within the above definition, e.g., methyl, ethyl, propyl, butyl, amyl, hexyl, octyl, decyl, dodecyl, hexadecyl, etc., or the corresponding unsaturated radicals. They may also be cyclic radicals such as phenyl, alkylphenyl, cycloheptyl, cyclohexyl, etc.

When succinic acid or an ester thereof is employed as reactant the products are acrylic acid or acrylates. These compounds, of course, find extensive utility as monomers in preparation of a wide variety of resinous polymers.

Suitable esters include esters of the above acids and any monohydric alcohol having from about two to 20 carbon atoms. The alcohols may be saturated or unsaturated, alicyclic or aromatic. Also, esters of glycol or glycerol may be used. Preferred alcohols are aliphatic or cycloaliphatic alcohols such as methanol, ethanol, propanol, isopropanol, butanol, pentanol, hexanol, octanol, decanol, cyclohexanol, etc.

The catalyst employed in the present invention comprises a complex of a Group VIII noble metal and a biphyllic ligand of phosphorus, arsenic or antimony.

The Group VIII noble metal can be palladium, rhodium, ruthenium, platinum, osmium or iridium. While catalysts containing any of these metals may be used in the reaction, palladium-containing catalysts are preferred because of their greater activity, particularly at relatively mild reaction conditions.

A catalytic quantity of the Group VIII noble metal-containing catalyst is used. This is generally an amount sufficient to provide a concentration of the Group VIII noble metal which is between about 0.002 and about 2.0 weight percent of the liquid reaction medium and preferably between about 0.05 and about 0.5 weight percent. The Group VIII noble metal can be added to the reaction medium as the metal itself or as a soluble salt, a carbonyl compound or a chelate. Examples of suitable salts are the nitrates and halides of the metals such as palladium chloride, palladium nitrate, rhodium acetate, ruthenium bromide, osmium fluoride, palladium iodide, etc. Examples of suitable chelates are palladium acetyl acetonate and complexes of the platinum group metal ions with such conventional chelating agents as ethylenediamine tetra-acetic acid and its alkali metal salts, citric acid, etc. The metal may be supported on an inner support such as carbon.

The biphyllic ligands comprise organic compounds having at least about three carbons and containing arsenic, antimony or phosphorus in a trivalent state. Of these, the phosphorus compounds, i.e., the phosphines, are preferred; however, the arsines and stibines can also be employed. In general these biphyllic ligands have the following structure:

$$E(R)_3,$$

or the following structure:

$$(R)_2E\,R'\,E(R)_2$$

wherein E is a trivalent atom selected from the class consisting of phosphorus, arsenic and antimony; and
wherein R is a member of the class consisting of hydrogen, alkyl from one to eight carbon atoms, aryl from six to eight carbons and halo and alkoxy substitution products thereof; and wherein R' is alkylene having from one to about eight carbons.

In addition, ligands with the following general structure

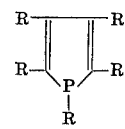

where R is hydrogen, alkyl or aryl may be used.

Examples of suitable biphyllic ligands having the aforementioned structure and useful in my invention to stabilize the catalyst composition are the following: trimethylphosphine, triethylarsine, triisopropylstibine, ethyldiisopropylstibine, tricyclohexylphosphine, triphenylphosphine, tri(o-toly)phosphine, phenyldiisopropylphosphine, phenyldiamylphosphine, diphenylethylphosphine, tris-panisylphosphine, tris(diethylaminomethyl)phosphine, ethylene bis(diphenylphosphine), hexamethylene bis(diisopropylarsine), pentamethylene bis(diethylstibine), 1,2,5-triphenylphosphol, etc. Of the aforementioned, the aryl phosphines are preferred because of their greater activity.

The reaction is performed under liquid phase conditions and when the dicarboxylic acid or ester is a liquid at the reaction conditions this material can be used in excess to provide the liquid reaction medium. If desired, however, any suitable organic liquid can be employed as a reaction solvent, preferably organic solvents which are inert to the reaction conditions, the reactants, the catalyst and the products. These include hydrocarbons such as the aromatic, aliphatics or alicyclic hydrocarbons, ethers, ketones, etc. Examples are naphthalene, o-dichlorobenzene, etc.

The reaction is performed under relatively mild conditions including temperatures from about 100° to about 300° C., preferably from about 150° to about 250° C. Sufficient pressure is used to maintain the reaction medium in liquid phase. Although superatmospheric pressure can be used, the rate of reaction is increased by subatmospheric pressures and, therefore, pressures from about $10^{-4}$ to about 20 atmospheres, may be used.

The following examples will serve to more specifically illustrate the practice of the invention.

EXAMPLE 1

To 100 g. of succinic acid and 2 g. palladium chloride bistriphenylphosphine in a 125 ml. flask was added 3 g. triphenylphosphine. A Dean-Stark Trap was attached and the mixture was heated to 230° C. Some 0.2 g. of acrylic acid distilled.

EXAMPLE 2

To 1 g. palladium chloride bistriphenylphosphine, 2 g. triphenylphosphine and 75 ml. diethyl succinate in a 250 ml. flask equipped with a Dean-Stark Trap was added heat to 210° C. for 2 hours. Some 5 ml. of a liquid product distilled consisting of ethyl acrylate and ethanol.

EXAMPLES 3 to 7

The following table shows the results of the reaction of dimethyl methylsuccinate using various catalysts. The runs of the examples were conducted in a 250 ml. flask equipped with a magnetic stirring bar, thermometer well and a Dean-Stark Trap which served to collect the volatile products. The three liquid products were methyl alcohol, methyl methacrylate and methyl crotonate. Some 20 ml. of the ester reactant were used in each run.

REACTION OF DIMETHYL METHYLSUCCINATE AT REFLUX

| Example | Catalyst | Wt., grams | Percent Methyl methacrylate | Percent Methyl crotonate |
| --- | --- | --- | --- | --- |
| 3 | PdCl$_2$.($\Phi_3$P)$_2$<br>$\Phi_3$P<br>p-Toluene sulfonic acid | 0.7<br>3.0<br>1.0 | 80 | 20 |
| 4 | PdCl$_2$($\Phi_3$P)$_2$<br>$\Phi_3$P<br>LiCl | 0.7<br>3.0<br>1 | 100 | 0 |
| 5 | PdBr$_2$<br>$\Phi_3$P | ½<br>3 | 90 | 10 |
| 6 | PdCl$_2$($\Phi_3$P)$_3$<br>$\Phi_3$P<br>LiCl | ½<br>2<br>1 | 90 | 10 |
| 7 | PdI$_2$<br>$\Phi_3$P | ½<br>3 | 100 | 0 |

I claim:

1. A process for preparation of olefinic acids or esters comprising contacting, at a temperature from 100° to 300° C. and sufficient pressure to maintain liquid phase conditions, a saturated dicarboxylic acid or ester thereof at elevated temperature with a complex catalyst comprising a Group VIII noble metal and a ligand from the group consisting of organic phosphines, arsines and stibines.

2. The process of claim 1 in which the reactant is a dicarboxylic acid.

3. The process of claim 2 in which the acid is succinic acid.

4. The process of claim 1 in which the reactant is a dicarboxylic acid ester.

5. The process of claim 4 in which the ester is an ester of succinic acid.

6. The process of claim 5 in which the ester is diethylsuccinate.

7. The process of claim 4 in which the ester is an ester of methylsuccinic acid.

8. The process of claim 7 in which the ester is dimethyl methylsuccinate.

9. The process of claim 1 in which the Group VIII noble metal is palladium.

10. The process of claim 1 in which the ligand is a triaryl phosphine.

11. The process of claim 8 in which the phosphine is triphenyl phosphine.

12. A process for preparation of acrylic acid comprising contacting succinic acid, at a temperature of about 100° to 300° C. and a pressure sufficient to maintain liquid phase conditions, with a complex catalyst comprising palladium and triphenylphosphine.

13. A process for preparation of an ester of acrylic acid comprising contacting the corresponding ester of succinic acid at a temperature of about 100° to 300° C., and a pressure sufficient to maintain liquid phase conditions, with a complex catalyst comprising palladium and triphenylphosphine.

* * * * *